Figure 1:
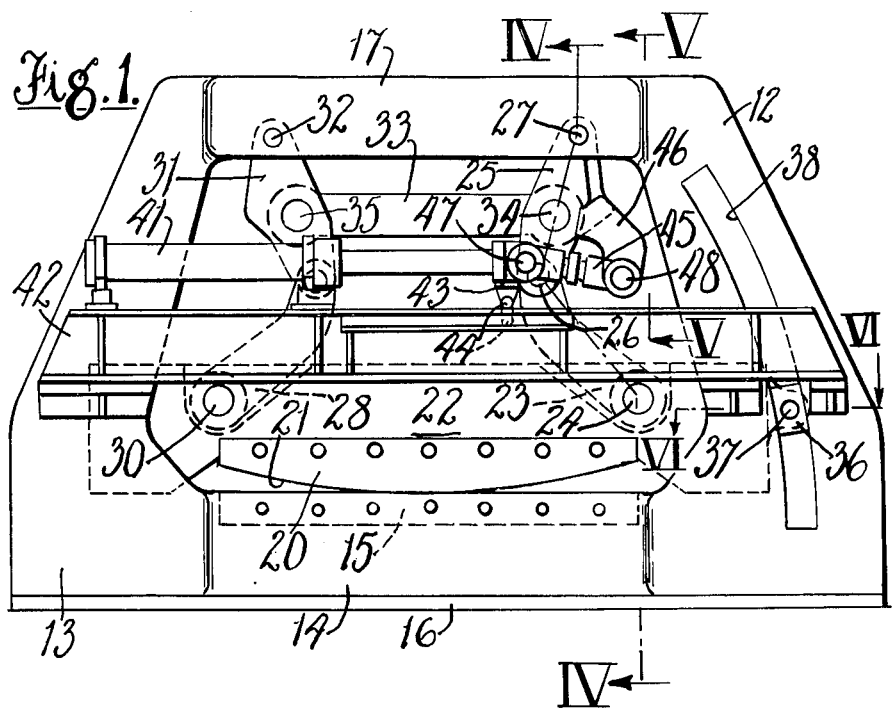

United States Patent [19]

Maltby

[11] 4,122,740
[45] Oct. 31, 1978

[54] SHEAR

[75] Inventor: Jack Maltby, Sheffield, England

[73] Assignee: Davy-Loewy Limited, Sheffield, England

[21] Appl. No.: 842,819

[22] Filed: Oct. 17, 1977

[30] Foreign Application Priority Data

Oct. 18, 1976 [GB] United Kingdom ............... 43112/76
Nov. 15, 1976 [GB] United Kingdom ............... 47453/76
Jun. 23, 1977 [GB] United Kingdom ............... 26370/77
Jul. 1, 1977 [GB] United Kingdom ............... 27614/77

[51] Int. Cl.² ............................................. B26D 5/18
[52] U.S. Cl. .................................................. 83/646
[58] Field of Search ................................. 83/646, 644

[56] References Cited

U.S. PATENT DOCUMENTS 3,316,791  5/1967  Greis et al. ................. 83/644 X
3,857,316  12/1974  Handley ..................... 83/644

Primary Examiner—J. M. Meister
Attorney, Agent, or Firm—Lee & Smith

[57] ABSTRACT

A rolling blade shear has a stationary blade and a movable blade which latter is mounted and driven to roll over the stationary blade. The movable blade is carried by a pair of opposed toggle mechanisms which are pivoted to a supporting frame and to the movable blade and which are coupled together so as to swing together. Guide means on the frame guide one end of the movable blade along a fixed path. The coupled toggle mechanisms are driven by hydraulic piston and cylinder units connected between the frame and the mechanisms.

11 Claims, 7 Drawing Figures

SHEAR

This invention relates to a shear, and particularly to a rolling cut shear having a stationary, and usually straight-edged, shear blade, and a movable, curved, shear blade which is so supported and driven that in operation the moving blade rolls relative to the stationary blade; during a cut, the centre of rotation of the movable blade moves reversibly along, or parallel to, the fixed blade so that the shearing of a workpiece is progressive.

A rolling cut shear has a particular application to the cutting of metal plate, e.g. up to 40 mm in thickness, because the movable blade need not overlap the stationary blade at any point during the cut, and therefore the sheared end engaged by the movable blade is not bent or otherwise distorted by the cutting action. When used, therefore, for trimming a plate, the scrap sheared is able to negotiate the scrap conveyors without jamming. If the shear is used for cutting plate to length, it is not necessary to pass the sheared plate through straighteners.

It is questionable whether there are available on the market any two rolling cut shears for plate, the majority being of the rocking blade type or those having a raked shear blade. Those that are claimed to have a rolling cutting action are driven by electric motors, the drive being transmitted to the moving blade through cranks and pitmen. Such shears are expensive and massive, and in particular have substantial height.

A rolling cut shear using a hydraulic piston and cylinder for the drive has been suggested in British patent specification No. 1,439,464. In that shear, the movable blade is supported at its ends by a pair of links, the upper ends of which are attached to a yoke sliding on a shaft extending parallel to, but above, the fixed shear. The resulting shear, if properly designed, is simpler than previous shears of the same capacity having allegedly a rolling cut action.

While the shear of British patent specification No. 1,439,464 is possibly suitable for use in clean environments, as in a stock yard, it could be used in steel works only with difficulty. Because of the forces transmitted by the sliding yoke, it and the shaft on which it slides must be well lubricated; but, contamination of lubricant on exposed parts of the shaft necessarily takes place to the detriment of its successful operation.

A rolling cut shear, according to the present invention, has a frame; a stationary blade carried by the frame; a movable blade to co-operate with the stationary blade; and supporting and driving means for the movable blade. The supporting and driving means comprise a pair of opposed toggle mechanisms which are pivoted to the movable blade at locations spaced along the length of the blade and are pivoted to the frame about axes substantially perpendicular to the length of the stationary blade, coupling means between the toggle mechanisms causing those mechanisms to swing together, hydraulic drive means operatively coupled to the toggle mechanisms for driving those mechanisms about their pivot axes, and means for guiding the movable blade; the arrangement is such that the swinging of the toggle mechanisms results in the movable blade executing a rolling motion relative to the stationary blade.

Toggle mechanisms are opposed, when, during swinging of the toggles, the included angle between the links of one toggle increases or decreases as the included angle between the links of the other toggle decreases or increases, respectively. It is that opposed variation of the included angles which contributes to the required rolling action of the movable blade. The term "opposed toggle mechanisms" thus exclude toggle mechanisms which provide a parallel motion.

In practice, the shear blades are replaceable, being secured in use to blade carriers. In that case, it is to be understood that the opposed toggle mechanisms are pivoted directly to the carrier for the movable blade, and indirectly to the movable blade itself.

Because of the use of the opposed toggle mechanisms, the movable blade is supported from the frame at fixed pivot axes; there is no difficulty in maintaining pivots continuously and well lubricated and in protecting them from contamination; the shear is thus well adapted for use in steel works and other dirty environments.

The coupling means preferably comprises a cross-link pivoted to those links of the toggle mechanisms that are pivoted to the frame. However, if found preferable, the cross-link may be pivoted to each toggle mechanism where the links of that mechanism are hinged together, or even to the links of the toggle mechanisms that are pivoted to the movable blade. The effective length of the cross-link may be adjustable, in order to ensure clearance between the blades prior to entry of the work.

Figure 2:
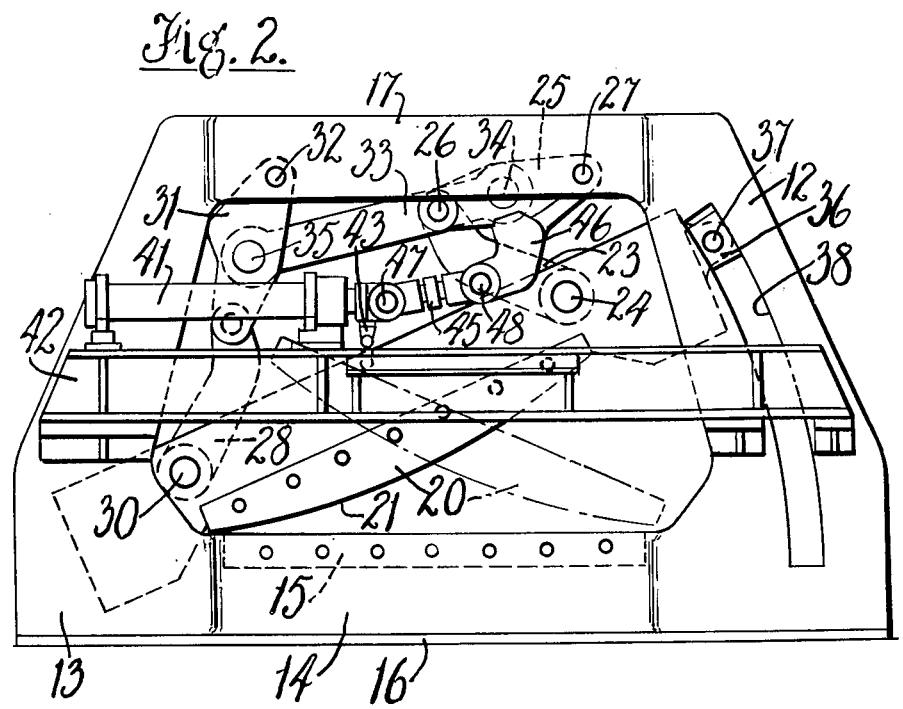
Figure 3:
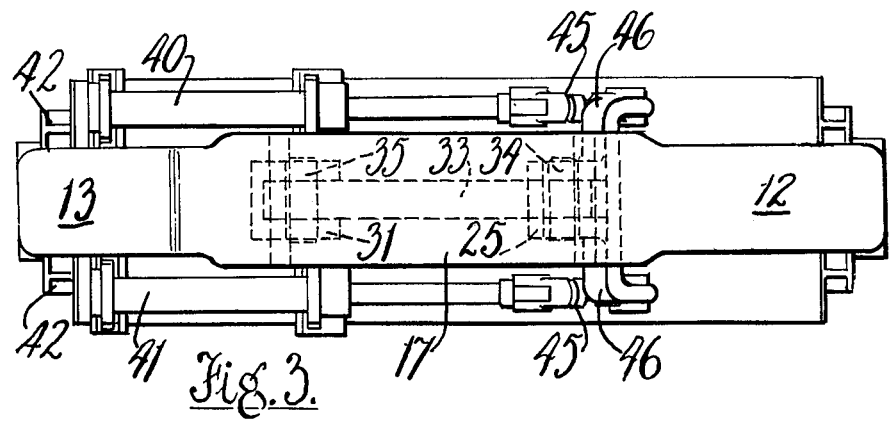
Figure 5:
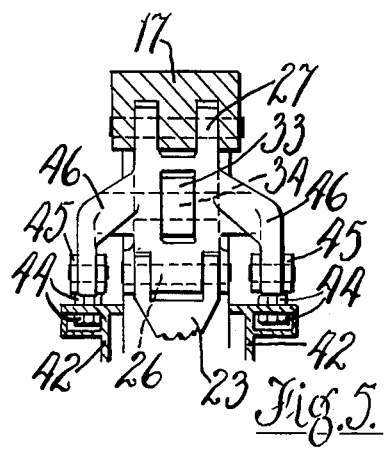
Figure 4:
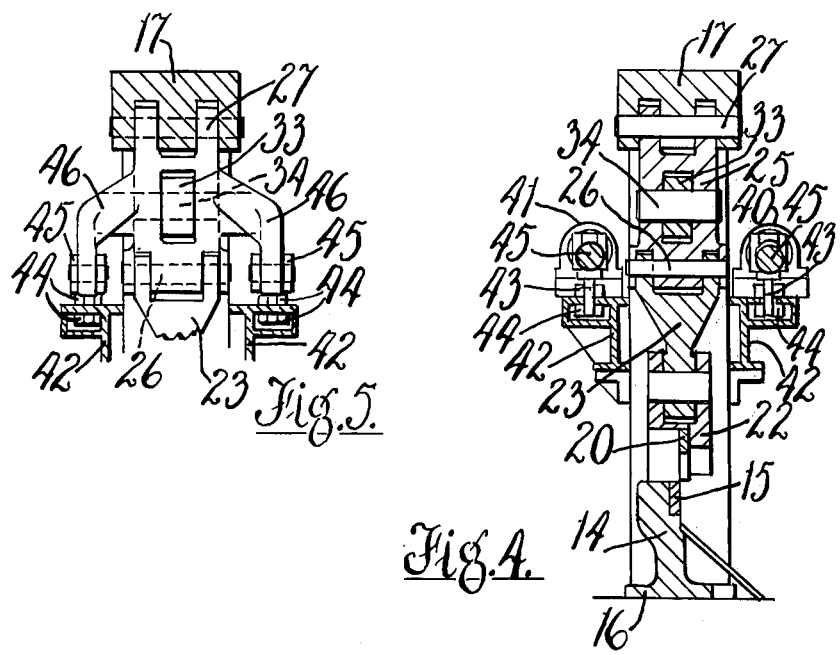
Figure 6:
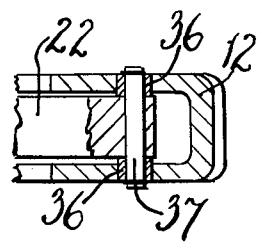
Figure 7:
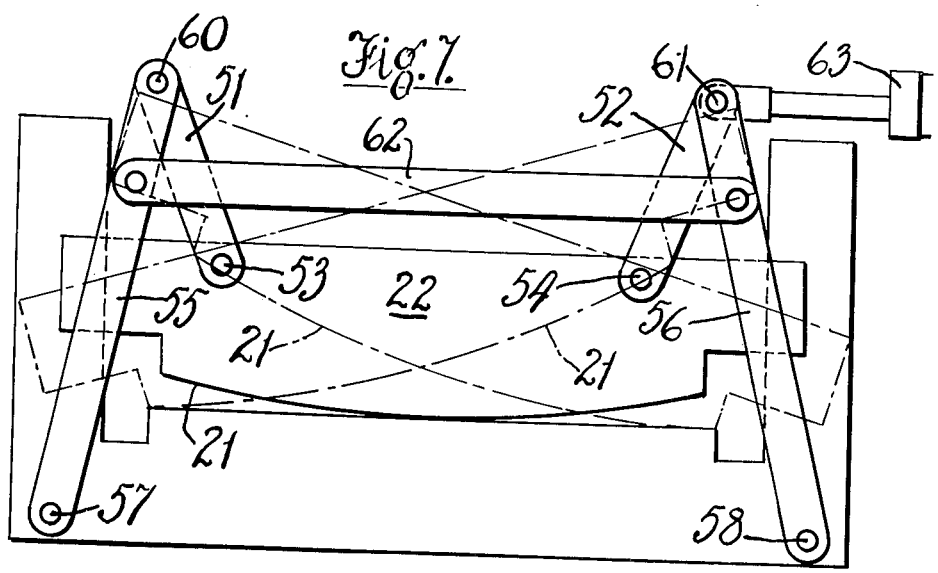

The invention will be more readily understood by way of example from the following description of rolling cut shears in accordance therewith, reference being made to the accompanying drawings, in which:

FIG. 1 is a front elevation of a preferred form of plate shear,

FIG. 2 is a view similar to that of FIG. 1, but with the movable blade and its actuating mechanism shown in full line at one end of a cutting stroke, and in chain line at the opposite end of that cutting stroke, FIG. 3 is a plan view of the shear of FIG. 1, FIGS. 4 and 5 are respectively sections on the lines IV—IV and V—V of FIG. 1, FIG. 6 is a scrap section view on the line VI—VI of FIG. 1, and FIG. 7 illustrates schematically in side view an alternative form of plate shear.

The plate shear shown in FIGS. 1 to 6 has a frame formed by a pair of box-like uprights 12 and 13, which are secured together at the bottom through a carrier 14 for the stationary blade 15. The base 16 of each upright 12, 13 and the carrier 14 are bolted to the floor. The uprights 12, 13 are also secured together by a top beam 17 which extends parallel to the stationary blade carrier 14.

A movable blade 20 has a curved edge 21 and is removably secured to a movable blade carrier 22. The blade carrier 22 is supported from the top beam 17 by a pair of opposed toggle mechanisms. A first of those mechanisms comprises a lower link 23 which is pivoted to the right-hand end of the carrier 22 by means of a pivot pin 24, and a second link 25, the lower end of which is pivoted to the upper end of link 23 by a pivot pin 26 and the upper end of which is pivoted to the beam 17 by a pin 27. Similarly, the second toggle mechanism consists of a lower link 28 pivoted by pin 30 to the left-hand end of the carrier 22, and an upper link 31, which is pivoted at its lower end to the upper end of link 28 by means of a pin similar to 26 and, at its upper end, to the beam 17 by a pin 32.

The two toggle mechanisms are connected by coupling means in the form of a cross-link 33, which is shown as pivoted at its ends to the upper links 25 and 31 by means of pivot pins 34 and 35 respectively. The cross-link 33 causes the two toggle mechanisms to swing together relative to the frame about the pins 27 and 32. The linkages are such that, during the swinging motion, the included angle between links 23 and 25 increases or decreases, as the included angle between the links 28 and 31 decreases or increases respectively, so that the carrier 22, and hence the movable blade 20, rotates during the swinging action.

The right-hand end of the blade carrier 22 is restrained to a prescribed path in the vertical plane by guide means. Those guide means are shown as consisting of slide blocks 36, which are carried on a pin 37 secured in the end of the carrier 22, and which slide in slots 38 formed in the upright 12.

The curvature of the slots 38 is dependent on the geometry of the toggle mechanisms and the cross-link 33 and are designed to ensure the required rolling movement of the movable blade 20 relative to the fixed blade 15 when the toggle mechanisms swing together about their respective pivot pins 27 and 32. Although the slots 38 are shown as being arcuate, by appropriate selection of the geometry of the links, it is possible to have slots which approximate to straight lines.

The shear has hydraulic means connected between the frame and the toggle mechanisms. As shown, the drive means comprise two piston and cylinder units 40, 41 mounted on opposite sides of the toggle mechanisms. A pair of beams 42 bridge the uprights 12 and 13 and support the cylinders of the hydraulic units. The piston end of each unit 40, 41 is supported by a trolley 43 having wheels 44 which run on the upper and lower faces of a flange of the respective beam 42 and ensure that the piston is at all times aligned with the cylinder. The piston end is connected with the lever 25 through an auxiliary link 45 and a lateral arm 46 which is secured to the link 25. In particular, the auxiliary link 45 is pivoted to the piston end and to the arm 46 by pins 47 and 48 respectively, and is in the form of a turnbuckle, which enables any disparity in the throws of the two piston and cylinder units to be compensated.

For a cut, the blade carrier 22 is initially in one of its extreme positions shown in FIG. 2, e.g. in that position shown in full line. As will be observed, when in its starting position the blade 20 is wholly displaced from the fixed blade 15 even at its left-hand end, thus enabling the plate to be sheared to be introduced between the two blades and the entire length of the blades to be utilised. The piston and cylinder units 40 and 41 are fully retracted.

When the plate is properly positioned in relation to the shear blades, the hydraulic units are actuated to drive the upper links 25 and 31 anticlockwise about the pivot pins 27 and 32. As the linkages turn, the left-hand end of blade 20 is first lowered towards the level of the stationary blade 15 so as to initiate the cutting of the plate. Further pivoting of the links 25, 31 results in the curved edge 21 of blade 20 rolling progressively over the blade 15, through the central position shown in FIG. 1 and finally to the terminal position shown in chain line in FIG. 2, where the right-hand end of the blade 20 is retracted away from the blade 15 to free the plate.

The next cut can then be effected from the position shown in chain line in FIG. 2 back to the position shown in full line in that figure. In other words, it is not necessary to retract the pistons of the units 40, 41 between successive cuts, those units being double-acting.

Because of the rolling motion of the blade 20, the edge 21 need not at any time descend lower than the upper edge of the stationary blade 15; indeed, for proper cutting, it is necessary for the movable blade to cut through only a proportion of the thickness of the plate, so that blade 20 need not at any time reach the level of blade 15. Because of the absence of overlapping of the blades 20 and 15, the portion of plate at the right-hand side of the blades as viewed in FIG. 4 is not bent downwards by blade 20 but has an undistorted cut edge. The shear thus avoids the problems associated with raked shears and rocking blade shears due to the bowing of the cut work.

It will further be observed that the toggle mechanisms are designed for best mechanical advantage. At the start of the cutting stroke, e.g. when the blade 20 is in the full line position of FIG. 2, the sharing of the force applied by the units 40, 41 is such that most of the force is applied at the left-hand end of the carrier 22, i.e. where the cut is being effected. As the cut continued, a progressively larger proportion of the applied force is applied to the right-hand end of the carrier, until, in the chain line position, almost all is transferred to the right-hand end of the blade 20. At the same time, the rate of change of vertical displacement is initially small at the left-hand end of blade 20 and relatively large at the right-hand end, but, as the blade 20 rolls over the blade 15, the rate of change at the left-hand end increases while that at the right-hand end decreases as required.

Various modifications of the rolling cut shear are of course possible. For example, a single piston and cylinder unit may be substituted for the twin units 41, 42 shown in the drawings. Secondly, if necessary, the single links 23, 25, 28 and 31 may be replaced by double links.

Thirdly, the cross-link 33 may be made adjustable in length. If for any reason in its starting position, the end of blade 20 is not displaced from blade 15 by the thickness of the work to be sheared, the full length of the blade 20 cannot be utilised for shearing with the consequence that the shear must be designed to have a blade length in excess of the longest plate to be sheared. To avoid that wasteful expedient, the separation of the blades for entry of the work can be increased by reducing the effective length of the cross-link.

Lastly, the shear of FIGS. 1 to 3 has the toggle mechanisms supporting the movable blade carrier 22 pivoted to the frame above the movable blade. It is, however, possible to have other configurations of the toggles. One such configuration is illustrated diagrammatically in FIG. 7, in which the movable blade 21 is shown in full line in its central position corresponding to FIG. 1 and in chain line in its two extreme positions, corresponding to those shown in FIG. 2.

As shown in FIG. 7, the movable blade carrier 22 is again supported by a pair of links 51, 52 which are pivoted to the carrier at 53 and 54 respectively and which extend upwardly from the carrier. The second links 55, 56 of the toggle mechanisms are pivoted to the frame at 57 and 58 respectively, at a level below the stationary blade. The links 55, 56 then project upwardly and are pivoted at 60, 61 respectively to the upper ends of links 51, 52 respectively above the movable blade carrier 22. Links 55 and 56 are coupled together by means of cross-link 62 which is also disposed above the movable blade carrier 22. The drive means is illustrated as a piston and cylinder unit 63, the piston of which is pivoted at the pivot axis between links 52 and 56 of the right-hand toggle mechanism. The configuration of FIG. 7 has an advantage over that of FIGS. 1 to 6, in that the overall height of the shear is lower.

What I claim as my invention and desire to secure by Letters Patent is:

1. A rolling cut shear having
   (a) a frame;
   (b) a stationary blade carried by said frame;
   (c) a movable blade to cooperate with said stationary blade; and
   (d) supporting and driving means for said movable blade, said means comprising:
   (e) a pair of opposed toggle mechanisms which are pivoted to said movable blade at locations spaced along the length of said movable blade, and are pivoted to said frame about axes substantially perpendicular to the length of said stationary blade;
   (f) coupling means between said toggle mechanisms causing said mechanisms to swing together;
   (g) hydraulic drive means operatively coupled to said toggle mechanisms for driving said mechanisms about said pivot axes; and
   (h) means for guiding said movable blade,
   (i) the swinging of said toggle mechanisms resulting in said movable blade executing a rolling motion relative to said stationary blade.

2. A rolling cut shear having
   (a) a frame;
   (b) a stationary blade carried by said frame;
   (c) a movable blade to cooperate with said stationary blade; and
   (d) supporting and driving means for said movable blade, said means comprising:
   (e) first and second opposed toggle mechanisms;
   (f) said first toggle mechanism comprising first and second hinged links pivoted respectively to said movable blade adjacent one end and to said frame about first and second pivot axes which are substantially perpendicular to the length of said stationary blade;
   (g) said second toggle mechanism comprising third and fourth hinged links pivoted respectively to said movable blade adjacent the other end thereof and to said frame about third and fourth pivot axes which are substantially perpendicular to the length of said stationary blade;
   (h) said second and fourth pivot axes being fixed in relation to said frame;
   (i) coupling means between said first and second toggle mechanisms causing said mechanisms to swing together about said second and fourth pivot axes;
   (j) hydraulic driving means operatively coupled to said toggle mechanisms for driving said mechanisms about said second and fourth pivot axes; and
   (k) means for guiding said movable blade,
   (l) the swinging of said toggle mechanisms resulting in said movable blade executing a rolling motion relative to said stationary blade.

3. A rolling cut shear as claimed in claim 2, in which said coupling means comprise a cross-link pivoted to each said toggle mechanism.

4. A rolling cut shear as claimed in claim 3, in which said cross-link is pivoted to said second and fourth links.

5. A rolling cut shear as claimed in claim 3, in which the effective length of said cross-link is adjustable.

6. A rolling cut shear as claimed in claim 2, in which said drive means comprise at least one hydraulic piston and cylinder unit operatively connected between the frame and one of said toggle mechanisms.

7. A rolling cut shear as claimed in claim 6, comprising also a laterally extending extension on one said toggle mechanism, and an auxiliary link pivoted to said extension, said hydraulic unit being pivoted to said auxiliary link.

8. A rolling cut shear according to claim 2, in which said guide means restrain one end of said movable blade to a predetermined path.

9. A rolling cut shear according to claim 8, in which said guide means comprise a slideway in said frame, and a slide block carried by said movable blade and slidably mounted in said slideway.

10. A rolling cut shear according to claim 2, in which said second and fourth pivot axes are located above said blades.

11. A rolling cut shear according to claim 2, in which said second and fourth pivot axes are located below said stationary blade; said second and fourth links extending upwards from said second and fourth pivot axes beyond the movable blade, and said first and third links extending upwardly to be pivoted to second and fourth links respectively above said movable blade.

* * * * *